May 7, 1968  J. G. HAWLEY ET AL  3,382,009
LIGHTWEIGHT, HIGH STRENGTH, STAMPED WHEEL
Filed Oct. 23, 1965

INVENTORS
JESSE G. HAWLEY, ALBERT W. COOK
& JOHN W. RUNNER
BY
J.B. Holden
ATTORNEYS

# United States Patent Office 3,382,009
Patented May 7, 1968

3,382,009
LIGHTWEIGHT, HIGH STRENGTH, STAMPED WHEEL
Jesse G. Hawley, Penn Yan, N.Y., and Albert W. Cook, Tallmadge, and John W. Runner, Akron, Ohio, assignors to The Goodyear Tire & Rubber Company, Akron, Ohio, a corporation of Ohio
Filed Oct. 23, 1965, Ser. No. 503,909
2 Claims. (Cl. 301—63)

ABSTRACT OF THE DISCLOSURE

An aircraft wheel formed from substantially identical wheel halves secured together by circumferentially spaced bolt means, each wheel half being formed from a pair of sheet metal stamping secured together, one stamping having an annular bearing receiving seat and the other stamping having an annular tire bead receiving seat.

---

The present invention relates to an improved, lightweight, high strength, stamped wheel particularly adapted to use on aircraft wherein the wheel is made of two substantially identical wheel halves, each wheel half formed from a pair of sheet metal stampings which are rolled or welded together.

Heretofore, there have been various types and kinds of lightweight wheels provided for aircraft, but, these wheels are usually produced by standard methods of casting of light metals, such as aluminum or magnesium. As such, there are several inherent problems which result in the quality of the wheel produced, such as quality deficiencies of the die or other type castings, lack of metal strength, fatigue characteristics, and the like.

It is the general object of the present invention to overcome the stated, and other difficulties, of the prior art, by providing a lightweight, high strength, fatigue-resistant, stamped aircraft wheel of sheet metal, usually aluminum and its alloys and wherein the resulting wheel provides equal or better performance at less cost than a die cast light metal wheel. This is accomplished with the weight of the stamped wheel being no greater than a similar tire size die cast wheel.

Another object of the invention is to provide a lightweight, stamped, aircraft wheel wherein each wheel is formed from identical or substantially identical wheel halves each comprising a hollow box-like section, each of which is formed from a pair of sheet aluminum alloy stampings, one stamping having a bearing receiving annular seat, and the second stamping a tire bead receiving annular seat.

Another object of the invention is to provide flanges, formed as an integral part of each of the sheet metal stampings forming the wheel half, wherein the flanges on the pair of metal stampings are interlocked with each other by brazing, welding or rolling to form the wheel half.

Another object of the invention is to provide circumferentially spaced bolt means extending through circumferentially spaced holes in the integral flanges of the pair of metal stampings, whereby the bolt means releasably secure together the wheel halves formd by the metal stampings.

These and other objects of the invention which will become apparent as the description proceeds, are achieved by providing in combination, an axle, a pair of bearings on the axle, a wheel formed from identical wheel halves, each wheel half mounted on one of said bearings, a pneumatic tire mounted on the wheel, the combination being characterized by each wheel half being formed from a pair of sheet metal stampings, one stamping having an annular bearing seat receiving a wheel bearing and an integral flange directed substantially radially outwardly and extending from the outer end of the annular bead seat, the other metal stamping of each wheel half having an annular seat for a tire bead terminating at its outer end in an annular radially outwardly directed flange adapted to engage with the side of the tire bead, said last-named flange being fixed to and mutually strengthening the outer periphery of the flange of the first-named stamping, the second stamping having an integral radially inwardly directed flange at the inner end of the bead seat, this flange extending into engagement with and joined to the inboard end of the bearing seat of the first-named stamping, and circumferentially spaced bolt means extending through the radially inwardly directed flanges of said second stamping thereby securing the wheel halves together, said first stamping having circumferentially spaced holes in the radially outward directed flange thereof to allow access to the bolt means.

For a better understanding of the apparatus of the invention, reference should be had to the following drawings wherein.

Figure 1:
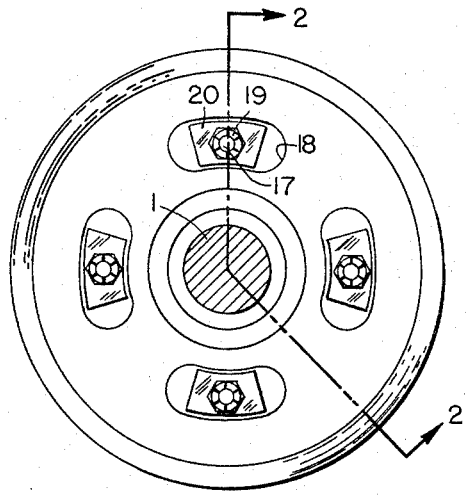
FIGURE 1 is an end elevation, partially in cross section, illustrating one embodiment of the invention.
Figure 2:
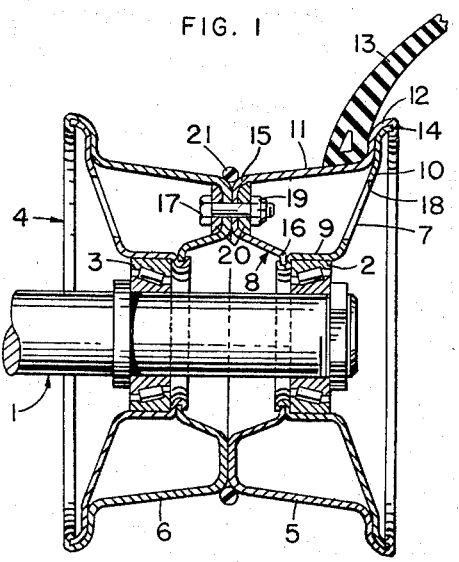
FIGURE 2 is a cross sectonal view taken on line 2—2 of FIGURE 1.

For a better understanding of the invention, reference should first be had to FIGURE 2 of the drawings wherein the numeral 1 generally indicates an axle to which a pair of bearings 2 and 3 are secured. Mounted on the bearings 2 and 3 is a wheel 4, which is formed from two identical wheel halves. Wheel half 5 is mounted on bearing 2 while wheel half 6 is mounted on bearing 3.

It should be understood that the wheel halves 5 and 6 are formed identical to each other and therefore, a detailed deecription will only be given of wheel half 5 since wheel half 6 is identical. Wheel half 5 is formed from a pair of metal stampings generally indicated by the numerals 7 and 8. Metal stamping 7 has an annular seat 9 which receives wheel bearing 2 and also an integral flange 10 which is directed substantially radially outwardly and extending from the outer end of the annular bead seat 9.

Stamping 8 has an annular bead seat 11 which terminates at its outer end in an annular radially outwardly directed flange 12. Flange 12 is adapted to engage with the side of the tire bead 13 and also to be fixed at 14 to the outer periphery of the flange 10 of stamping 7. Flange 12 extends into engagement with and is preferably rolled to join flange 10 at 14.

Extending from the inner end of the annular bead seat 11 is an integral radially inwardly directed flange 15 which extends into engagement and is joined to the inner end of the annular bearing seat 9 as by rolling at 16. Thus, the two metal stampings 8 and 9 are securely interlocked to form the wheel half 7.

It should be noted here that each wheel half forms a hollow circular box-beam of relatively light wall but high strength, and with each stamping of the wheel half reinforcing the other. Each stamping is usually made from aluminum sheet or an aluminum alloy, such as Duralumin.

Extending through the radially inwardly directed flange 15 of stamping 8 are circumferentially spaced bolts 17 which function to secure the wheel halves 5 and 6 together. Metal stamping 7 also has circumferentially spaced holes, indicated by the numeral 18, cut in the radially outwardly directed flange 10 in order to allow access to bolts 17. Releasably securing the bolts 17 to the wheel halves 5 and 6 are nuts 19 and washer pads 20. When the wheel illustrated and described is used with a tubeless tire, there is also employed a sealing gasket 21 which acts to effect a tight seal between the wheel halves 5 and 6. The tire 13 is mounted on the wheel 4 by removing nuts 19, taking the wheel halves 5 and 6 apart, putting a wheel half on each side of the tire, and bolting the wheel halves together. During this bolting if gasket 21 is used it is rolled up on one wheel half out of the way and is thereafter pushed back to the sealing position shown when bolting is completed. The light small tire normally mounted on the wheel allows the tire beads to be moved and the gasket manipulated as described.

Figure 3:
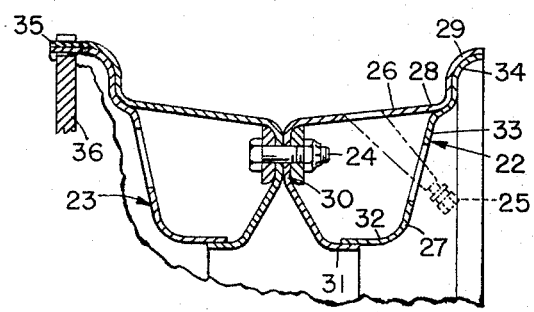
FIGURE 3 is a view similar to FIGURE 2 but showing a modification of the invention.

In the modification of the invention shown in FIGURE 3, wheel half 22 is secured to identical wheel half 23 by bolts 24. No seal is utilized between the wheel halves because the wheel is used to mount a tire (not shown) having a regular inner tube therein. The tube (not shown) is provided with a valve stem 25 extending through an appropriate hole cut in one wheel half.

Wheel half 22 is formed of stamped sheet metal parts 26 and 27, part 26 providing a bead seat 28, a bead retaining flange 29, and a substantially radially directed portion 30 terminating in an axially directed portion 31. Part 27 includes an axially directed bearing receiving seat 32 in sliding contact with portion 31, a substantially radially directed portion 33 terminating in a flange 34 underlying the bead seat 28 and bead retaining flange 29. The end of portion 31 cooperates with bearing seat 32 to position a wheel bearing 35 for mounting the wheel on an axle (not shown).

Because the other half of the wheel is substantially identical except for the valve hole, it will not be described in detail. Suffice it to note that wheel half 23 may be, if desired, formed with extensions 35 at circumferentially spaced points which serve as splines to drive a brake disk 36. If the wheel is not to be braked the wheel halves are identical.

Instead of securing the half wheel stampings together by rolling in FIGURE 3 the stampings of each wheel half are preferably secured together by brazing in the contacting areas and this serves the dual purpose of heat treating the stamped wheel parts.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, an axle, a pair of bearings on the axle, a wheel formed from substantially identical wheel halves, each wheel half mounted on one of said bearings, a pneumatic tire mounted on the wheel, the combination being characterized by each wheel half being formed from a pair of sheet metal stampings, one stamping having an annular bearing seat receiving a wheel bearing and an integral flange directed substantially radially outwardly and extending from the outer end of the annular bead seat, the other metal stamping of each wheel half having an annular seat for a tire bead terminating at its outer end in an annular radially outwardly directed flange adapted to engage with the side of the tire bead, said last-named flange being fixed to and mutually strengthening the outer periphery of the flange of the first-named stamping, the second stamping having an integral radially inwardly directed flange at the inner end of the bead seat, this flange extending into engagement with and joined to the inboard end of the bearing seat of the first-named stamping, and circumferentially spaced bolt means extending through the radially inwardly directed flanges of said second stampings thereby securing the wheel halves together, said first mentioned stampings having circumferentially spaced holes in the radially outward directed flange thereof to allow access to the bolt means.

2. A wheel formed from substantially identical halves, each half being made from a pair of sheet metal stampings joined together, one stamping having a tire bead seat, an integral flange extending radially outward from the outer end of the bead seat, an integral flange extending radially inward from the inner end of the bead seat and terminating in an integral flange directed axially away from a vertical center plane through the wheel perpendicular to the wheel axis, said second stamping having a wheel bearing seat sliding inside the axially directed flange, an integral flange extending radially outward from the outer end of the bearing seat, brazing means joining the radially outward flanges, and brazing means joining the bearing seat and the axially directed flange to form each wheel half as an annular hollow box-beam section.

References Cited

UNITED STATES PATENTS

| | | | |
|---|---|---|---|
| 1,969,088 | 8/1934 | Maranville | 301—6 |
| 2,005,628 | 6/1935 | Maranville | 301—63 |
| 2,230,193 | 1/1944 | Shinn | 301—6 |
| 2,348,550 | 5/1944 | Kraft | 301—63 X |
| 2,406,068 | 8/1946 | Frank | 301—63 |

FOREIGN PATENTS

| | | |
|---|---|---|
| 358,992 | 5/1938 | Italy. |

RICHARD J. JOHNSON, *Primary Examiner.*